United States Patent Office 3,106,670
Patented Oct. 8, 1963

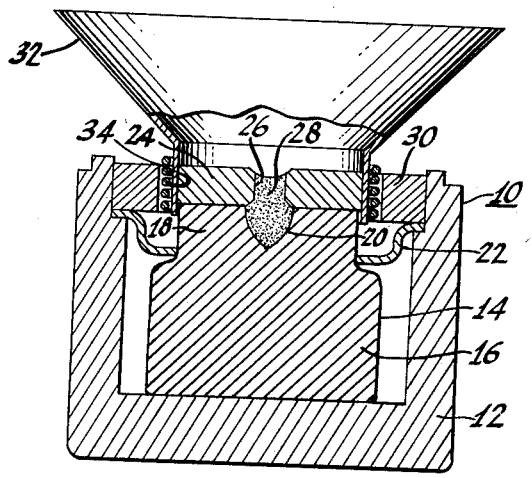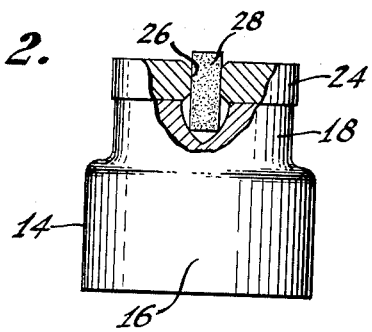

3,106,670
MAGNETIC FIELD STRUCTURE
FOR LOUDSPEAKERS
David E. Laux, Medford, N.J., assignor to Radio Corporation of America, a corporation of Delaware
Filed Apr. 21, 1960, Ser. No. 23,666
7 Claims. (Cl. 317—201)

This invention relates to magnetic field structures for loudspeakers and the like, and more particularly to means for securing pole caps to permanent magnets in such field structures.

In loudspeakers of the permanent magnet type, it has been found advantageous to utilize a pole cap on the end of the permanent magnet positioned within the yoke plate in order to increase the amount of flux in the gap between the permanent magnet and the yoke plate. A difficulty encountered in using a pole cap is securing it to the permanent magnet without increasing the reluctance between these two bodies, since an intervening layer of fastening material (i.e., solder, cement, etc.) is customarily used.

It is therefore a primary object of this invention to provide an improved magnetic field structure which will be free from the aforementioned difficulty.

It is another object of this invention to provide an improved magnetic field structure for loudspeakers or other electro-magnetic transducers which will allow a maximum and uniform flow of flux between the permanent magnet and its attached pole cap which form part of the field structure.

It is also an object of this invention to provide an improved magnetic field structure which is of rugged construction and which will withstand severe shock without affecting the performance of the unit.

It is still a further object of this invention to provide an improved magnetic field structure as aforesaid which is simple and economical to manufacture and which is efficient in use.

According to one form of this invention, a magnetic field structure for a loudspeaker or the like is provided which contains a cup-shaped yoke in which is positioned a permanent magnet. A yoke plate having a central opening is inserted within the open end of the cup-shaped yoke. A pole cap, also provided with a central opening, is then so positioned on the end surface of the permanent magnet that it extends into the opening in the yoke plate. A deformable pin member is inserted through the opening in the pole cap and into a depression in the permanent magnet and pressure is applied to the pin in an axial direction. This pressure deforms the pin laterally within the pole cap opening, as well as within the depression in the magnet, whereby to secure the pole cap to the permanent magnet. Thus, a firm coupling is provided between the magnet and its pole cap without introducing appreciable, additional reluctance therebetween.

The novel features of the invention, both as to its organization and method of assembly, as well as additional objects and advantages thereof, will be understood more fully from the following description, when read in connection with the accompanying drawing in which:

FIGURE 1 is a central, sectional view of a loudspeaker provided with one form of magnetic field structure according to the present invention, and FIGURE 2 is a side elevation, partly in section, of the permanent magnet and pole cap of the field structure and showing the deformable pin member inserted in place therein prior to being deformed.

Referring, now, more particularly to FIG. 1 of the drawing, a magnetic field structure 10 is shown having a magnetic yoke 12. The yoke 12 is constructed of a magnetic material and is preferably made of a low-magnetic-reluctance grade of iron. The yoke 12 is illustrated as being cup-shaped with an opening in one end thereof, but it could be formed in any number of different shapes. Positioned within the magnetic yoke 12 is a permanent magnet 14 which is formed with a base portion 16 and a neck portion 18 which is slightly smaller in diameter than the base portion 16. The neck portion 18 is formed with a depression 20 in its end surface adjacent to a yoke plate to be hereinafter described, the depression 20 being preferably somewhat cone-shaped. A centering ring 22 is locked in place by the installation of the yoke plate, positioned between the yoke 12 and the permanent magnet 14, thereby securely holding the permanent magnet 14 in place. An annular pole cap 24, formed with a central opening 26 therethrough, is so disposed on one surface of the permanent magnet 14 that the opening 26 is approximately axially aligned with the depression 20. The pole cap 24 is constructed of low-carbon steel or soft iron.

As illustrated in FIG. 2, an elongated, deformable pin member 28 is inserted through the opening 26 in the pole cap 24 and into the depression 20. The pin member 28 is preferably formed with a cross section substantially the same as the opening in the pole cap 24 and is formed of any malleable material, such as soft aluminum or 30–70 solder, neither of which will affect the flow of flux between the permanent magnet 14 and the pole cap 24, except in a very small center area where the pin is located. When pressure is applied to the pin member 28 longitudinally therealong, it will be deformed laterally or radially within the opening 26 and the depression 20 to the form shown in FIG. 1, whereby lateral pressure is applied against the walls of the opening 26 and the depression 20, thereby firmly connecting the pole cap 24 to the permanent magnet 14. An annular, magnetic yoke plate 30, formed with a central opening therethrough, is positioned within the magnetic yoke 12 at the open end thereof and is adapted to receive the pole cap 24 therein. The yoke plate 30 is made of soft iron and may be of the same material as the yoke 12. A diaphragm 32 having a voice coil 34 is suitably mounted to position the coil 34 within the gap between the pole cap 24 and the yoke plate 30.

In assembling the field structure, the permanent magnet 14 is positioned within the cup-shaped yoke member 12 and is held in a generally central position by means of the centering ring 22. The yoke plate 30 is positioned in the open end of the yoke member 12, as by a force fit. The pole cap 24 is then placed on the end surface of the permanent magnet 14 formed with the depression 20 and is centered in the opening in the yoke plate 30 by means of a ring gauge (not shown) which is inserted in the gap between the pole cap 24 and the yoke plate 30. Next, the deformable pin member 28 is inserted through the opening 26 in the pole cap 24 and into the depression 20, as shown in FIG. 2. Pressure is then applied to the end of the pin member 28 in a longitudinal direction in order to cause it to be deformed laterally or radially against the walls of the opening 26 and the depression 20 in order to apply lateral pressure against the walls and thereby firmly connect the pole cap to the permanent magnet. The pole cap 24 is thus secured to the permanent magnet 14 while being held in the centered position by the ring gauge. The ring gauge is then removed. By utilizing a pin member 28 such as described, there is no film of cement, solder or the like between the permanent magnet 14 and the pole cap 24 to introduce reluctance between the magnet and the pole cap. Thus, the previously mentioned disadvantage of prior art field structures is avoided.

From the foregoing description, it will be apparent that I have provided an improved method of connecting a pole cap to a permanent magnet and, hence, an improved magnetic field structure. While I have illustrated and described one particular type of permanent magnet and pole cap, it will, no doubt, be apparent to those skilled in the art that various changes may be made in this particular form disclosed, and that other forms are possible, all within the spirit of the present invention. Hence, I desire that the foregoing be taken merely as illustrative and not in a limiting sense.

I claim as my invention:

1. In a magnetic field structure for a transducer, the combination of a permanent magnet, a magnetic pole cap for said magnet, said magnet and said pole cap having substantially axially aligned openings, and a pin member in said openings deformed laterally within said openings and applying lateral pressure against the walls of said openings and firmly engaging the walls of said openings and thereby connecting said permanent magnet to said pole cap.

2. In a magnetic field structure, a permanent magnet formed with a depression in one end thereof, a magnetic pole cap having an opening therethrough, said pole cap engaging said one end of said magnet with its said opening in alignment with said depression, and a pin member extending through said opening in said pole cap and into said depression, said pin member being deformed laterally and securing said pole cap to said end of said permanent magnet.

3. A magnetic field structure according to claim 2 wherein said deformable pin member is made of malleable material.

4. A magnetic field structure for an electro-acoustical transducer comprising a magnetic yoke having an opening in one end thereof, a magnetic yoke plate having an opening therethrough, said yoke plate being positioned within the opening in said one end of said yoke, a permanent magnet positioned within said yoke, means for securing said permanent magnet within said yoke, said permanent magnet being formed with a depression in the end surface adjacent to said yoke plate, a pole cap having an opening therethrough, said pole cap being positioned on said end surface of said permanent magnet so that said pole cap is substantially centered within said yoke opening, and a deformable pin member extending through said hole in said pole cap and into said depression, said pin member being laterally deformed and connecting said pole cap to said permanent magnet.

5. A magnetic field structure according to claim 4 wherein said depression is substantially cone-shaped and said deformable pin member is of substantially the same cross section as the opening in said pole cap.

6. A magnetic field structure according to claim 5 wherein said deformable pin member is formed of soft aluminum.

7. A magnetic field structure for loudspeakers comprising a cup-shaped magnetic yoke having an opening in one end thereof, an annular, magnetic yoke plate having an opening therethrough, said yoke plate being positioned in said opening in said one end of said cup-shaped member, a permanent magnet positioned within said cup-shaped yoke, means for securing said permanent magnet within said cup-shaped yoke, said permanent magnet being formed with a depression in the end surface adjacent said yoke plate, a circular pole cap having an opening therethrough, said pole cap being positioned on said end surface of said permanent magnet so that said depression is axially aligned with said opening in said pole cap, and an elongated, deformable pin member having a cross section substantially the same as the opening in said pole cap extending through said opening in said pole cap and into said depression, said pin member being laterally expanded within an area defined by said depression and securing said pole cap to said permanent magnet and preventing lateral movement of said pole cap on said end surface.

References Cited in the file of this patent

UNITED STATES PATENTS

| | | |
|---|---|---|
| 1,941,476 | Jensen | Jan. 2, 1934 |
| 2,432,819 | Schumacker | Dec. 16, 1947 |
| 2,501,031 | Cunningham | Mar. 21, 1950 |
| 2,501,032 | Harbaugh | Mar. 21, 1950 |
| 2,524,297 | Quam | Oct. 3, 1950 |
| 2,537,723 | Ward | Jan. 9, 1951 |
| 2,622,903 | Lavarack | Dec. 23, 1952 |
| 2,768,430 | Foogde et al. | Oct. 30, 1956 |
| 2,867,894 | Hill | Jan. 13, 1959 |
| 2,922,851 | Manley | Jan. 26, 1960 |
| 2,923,783 | White | Feb. 2, 1960 |

FOREIGN PATENTS

| | | |
|---|---|---|
| 643,465 | Great Britain | Sept. 20, 1950 |
| 928,854 | France | June 16, 1947 |